United States Patent [19]

Brandes et al.

[11] Patent Number: 5,438,102
[45] Date of Patent: Aug. 1, 1995

[54] SOLID ELASTOMERIC BLOCK COPOLYMERS

[75] Inventors: Ellen B. Brandes, Plainsboro, N.J.; Frederick C. Loveless, Yardley, Pa.

[73] Assignee: Mobil Oil Corporation, Fairfax, Va.

[21] Appl. No.: 80,638

[22] Filed: Jun. 24, 1993

[51] Int. Cl.$^6$ .......................................... C08F 297/04
[52] U.S. Cl. ................................. 525/314; 525/250; 525/271; 525/285; 525/315; 525/332.3; 525/332.5; 525/940; 525/98
[58] Field of Search .............. 525/314, 250, 271, 315, 525/285, 98

[56] References Cited

U.S. PATENT DOCUMENTS

| | | | |
|---|---|---|---|
| 4,107,236 | 8/1978 | Naylor et al. | 525/314 |
| 4,294,942 | 10/1981 | Henderson | 525/314 |
| 4,304,881 | 12/1981 | Aoki et al. | 525/314 |
| 4,879,349 | 11/1989 | Hoxmeier | 525/332.8 |
| 5,187,236 | 2/1993 | Coolbaugh et al. | 525/314 |

FOREIGN PATENT DOCUMENTS 0315280  5/1989  European Pat. Off. .
328729  7/1988  Japan .

OTHER PUBLICATIONS

Falk, Journal of Polymer Science: Part A-1, vol. 9, 2617–2623, 1971.
Falk et al., Die Angewandte Makromelekulare Chemie 21 (1972), 17–23 (No. 286).
Mohajer et al., "Hydrogenated linear block copolymers of butadiene and isoprene: effects of variation of composition and sequence architecture on properties," Polymer, 1982, vol. 23, Sep., 1523–1535.

Primary Examiner—James J. Seidleck
Assistant Examiner—M. L. Warzel
Attorney, Agent, or Firm—A. J. McKillop; M. D. Keen

[57] ABSTRACT

There are disclosed novel, solid, elastomeric block copolymers having excellent oxidative and thermal stability, wherein the terminal blocks are each a polymer (D polymer) of at least one conjugated diene D, which is a hydrocarbon containing a 1,3-conjugated diene structure wherein the 2 and 3 carbon atoms are each additionally bonded to a hydrocarbyl side group, e.g., 2,3-dimethyl-1,3-butadiene, with a preponderance of polymerized D units being 1,4 units; and at least one interior block is a hydrogenated polymer (I polymer) of at least one conjugated diene I which is a hydrocarbon containing a 1,3-conjugated diene structure wherein one of the 2- and 3-carbon atoms is additionally bonded to a hydrocarbyl side group and the other is additionally bonded to a hydrogen atom, e.g. isoprene. The block copolymers may be prepared by selectively hydrogenating substantially all the I polymer units of a precursor block copolymer with a sufficient number of D units in the D polymer blocks retaining their unsaturation on selective hydrogenation to enable the vulcanization of the block copolymer.

50 Claims, No Drawings

SOLID ELASTOMERIC BLOCK COPOLYMERS

BACKGROUND OF THE INVENTION

Field of the Invention

This invention relates to novel, solid, elastomeric block copolymers having a degree of unsaturation sufficient for desired vulcanization or cross-linking, or other chemical modification, but not so high as to cause the copolymer to be susceptible to an undesirably large amount of oxidative, thermal or photolytic degradation.

Description of Related Art

Elastomers (or rubbers) of either natural or synthetic origin usually require vulcanization for transformation into insoluble, non-deformable high strength elastomeric products. Before vulcanization, rubbers possess inferior properties and low strength which limit their utility.

There are a number of well known methods for achieving the vulcanization, also referred to as cross-linking, of unsaturated elastomers. Such methods include the use of sulfur and accelerators, peroxides, benzoquinone dioxime, certain phenolic resins and similar agents. Any of the above or any other well known vulcanizing techniques may be utilized to cross-link the elastomers of this invention.

The great majority of currently known synthetic elastomers are based on polymers or copolymers of butadiene or isoprene. These polymers, which include cis-polybutadiene, emulsion polybutadiene (EBR), styrene-butadiene copolymer (SBR), butadiene-acrylonitrile copolymer (NBR) and cis-polyisoprene, provide raw materials for the production of a very large volume of rubber goods, such as automotive tires, conveyor belts, adhesives, footwear, sponge and mechanical goods. Because of the high degree of unsaturation inherent in the polymeric backbones, these elastomers are easily and quickly vulcanizable alone or in blends. A secondary consequence of the high degree of backbone unsaturation is the instability of such elastomers in the presence of ozone and oxygen, both of which promote rapid deterioration of these elastomers.

Butyl rubber, which is a copolymer of isobutylene and 2-3% by weight (wt.) of isoprene, represents a class of elastomers far more resistant to oxygen and ozone than those based on butadiene or isoprene. The backbone of butyl rubber is primarily polyisobutylene (which provides a saturated spine) into which there is randomly copolymerized about 2-3% by wt. of isoprene to provide unsaturated sites for vulcanization. Butyl rubber finds limited use because of its relatively poor elastomeric properties, and is used primarily in applications which take advantage of its damping properties, weathering resistance and low gas permeability.

Ethylene-propylene-diene rubber (EPDM) has enjoyed substantial commercial growth as a synthetic rubber since it combines excellent oxidation resistance with good elastomeric properties. This elastomer is prepared by the polymerization of ethylene, propylene and a non-conjugated diene, such as 1,4-hexadiene, dicyclopentadiene or ethylidene norbornene. Diene incorporation is typically 5-10% by weight (wt.). The diene is randomly incorporated into the saturated ethylene-propylene backbone to provide pendant vulcanization sites.

The above prior art elastomers, with either high or low levels of unsaturation, are characterized in that, having random unsaturation, they are randomly cross-linked all along the molecular backbone during vulcanization. The success of vulcanization in incorporating all molecular chains into the final cross-linked network with minimal "loose ends" is termed the degree of network perfection. In order to insure the highest degree of network perfection attainable, randomly unsaturated elastomers must be cross-linked extensively. The large number of cross-links necessary (12 to 40 per 100,000 molecular weight) dictates that the average distance between cross-links ($M_c$) must be relatively small in comparison with the dimensions of the whole molecule. Elastomeric properties, such as elongation, depend greatly on $M_c$, e.g., the smaller the $M_c$, the lower the elongation of the vulcanized polymer.

Highly unsaturated elastomers such as polybutadiene or natural rubber retain essentially all of their original unsaturation after vulcanization. Such high level of backbone unsaturation causes these elastomers to be very susceptible to degradation by oxygen, ozone, heat and light. Such inherent instability frequently necessitates the use of appreciable amounts of expensive stabilizing additives and automatically restricts the use of these polymers in areas where degradative conditions are severe.

Various block copolymers having excellent elastomeric properties, especially elongation, have been made in the past. For example, a block copolymer commonly known as KRATON, manufactured by Shell Chemical Company, which has outstanding properties at room temperature, is a thermoplastic elastomer consisting of block segments of polymerized styrene units and polymerized aliphatic diolefin units, such as butadiene or isoprene. The most common structure of KRATON is the linear A-B-A block, such as styrene-butadiene-styrene (S-B-S) or styrene-isoprene-styrene (S-I-S). One of such rubbers is believed to be described by Jones, U.S. Pat. No. 3,431,323. Jones discloses block copolymers containing block segments of polymerized vinyl arene monomer units, e.g., styrene, butadiene monomer units, and vinyl arene units. After the block copolymer is prepared, it may be subjected to hydrogenation to such a degree that the unsaturation of the polybutadiene block is reduced to less than 10% of its original value, while 10-25% of the poly-vinyl arene block segments are hydrogenated. Although the KRATON triblock copolymers have excellent elastomeric properties at room temperature, they are thermoplastic materials which lose these properties at temperatures of about 80° C. (and higher). In addition, since these polymers are not chemically cross-linked, they are soluble in many organic solvents. These latter two deficiencies place some restrictions on the viable areas of application for these polymers.

Falk, JOURNAL OF POLYMER SCIENCE: PART A-1, Volume 9, 2617-2623 (1971), the entire contents of which are incorporated herein by reference, discloses a method of selectively hydrogenating 1,4-polybutadiene units in the presence of 1,4-polyisoprene units. More particularly, Falk discloses selective hydrogenation of the 1,4-polybutadiene block segment in the block copolymer of 1,4-polybutadiene—1,4-polyisoprene—1,4-polybutadiene and in random copolymers of butadiene and isoprene, with both polymerized monomers having a predominately 1,4-microstructure. Selective hydrogenation is conducted in the presence of hydrogen and a catalyst made by the reaction of organoaluminum or lithium compounds with transition metal salts of 2-ethylhexanoic acid.

Falk, DIE ANGEWANDTE CHEMIE 21 (1972) 17–23 (No. 286), the entire contents of which are also incorporated herein by reference, discloses the selective hydrogenation of 1,4-polybutadiene segments in a block copolymer of 1,4-polybutadiene-1,4-polyisoprene-1,4-polybutadiene and a random copolymer of 1,4-butadiene and 1,4-isoprene.

Hoxmeier, U.S. Pat. No. 4,879,349 and corresponding Published European Patent Application 88202449.0, filed on Nov. 2, 1988, Publication Number 0 315 280, published on May 10, 1989, disclose a method of selectively hydrogenating a polymer made from at least two different conjugated diolefins. One of the two diolefins is more substituted in the 2 and/or 3 position than any other diolefin and produces tri- or tetra-substituted double bonds after polymerization. The selective hydrogenation is conducted under such conditions as to hydrogenate the ethylenic unsaturation incorporated into the polymer from the lesser substituted conjugated diolefin, while leaving unsaturated at least a portion of the tri- or tetraethylenic unsaturation incorporated into the polymer by the more substituted conjugated diolefin.

Mohajer et al., "Hydrogenated linear block copolymers of butadiene and isoprene: effects of variation of composition and sequence architecture on properties" POLYMER 1982, Vol 23, September, 1523–1535, disclose essentially completely hydrogenated butadiene-isoprene-butadiene (HBIB), HIBI and HBI block copolymers in which butadiene has predominantly 1,4-microstructure.

Kuraray K K, Japanese published patent application Number JP-328729, filed on Dec. 12, 1987, published on Jul. 4, 1989, discloses a resin composition comprising 70–99% wt. of a polyolefin (preferably polyethylene or polypropylene) and 1–30% wt. of a copolymer obtained by hydrogenation of at least 50% of the unsaturated bonds of an isoprene/butadiene copolymer.

Application Ser. No. 07/466,233, now U.S. Pat. No. 5,187,236, filed Jan. 16, 1990 by Coolbaugh et al. discloses solid block and random copolymers of an "I" type of conjugated diene, e.g. isoprene, and a "B" type of conjugated diene, e.g., butadiene, which are selectively hydrogenated such that the polymerized B units are substantially completely hydrogenated to yield elastomeric units highly resistant to ozone and oxygen degradation, while sufficient unsaturation remains among the polymerized I units to allow for subsequent curing or chemical modification of the polymer. Both linear and star-branched polymers are included in the disclosure.

Application Ser. No. 07/735,552, now U.S. Pat. No. 5,292,820, filed Jul. 25, 1991 by Coolbaugh et al. discloses selectively hydrogenated linear and star branched block copolymers of "I" and "B" type conjugated dienes as shown in previously described U.S. Pat. No. 5,187,236 and also containing blocks of a polymer of an aryl-substituted olefin, e.g., styrene, for the purpose of improving the resistance to cold flow and green strength of the polymer before vulcanization.

Application Ser. No. 07/836,577, U.S. Pat. No. 5,276,100, filed Feb. 18, 1992 by Coolbaugh et al. discloses polymers similar to those of U.S. Pat. No. 5,292,820 discussed previously except that in place of blocks of polymers of an aryl-substituted olefin, the resistance to cold flow and green strength before vulcanization of the polymer are improved by the presence of blocks of crystalline polyethylene obtained by the selective hydrogenation of blocks of polymers of 1,4-butadiene units.

Pending application Ser. No. 07/466,136 filed Jan. 16, 1990 by Coolbaugh et al. discloses hydrogenation catalysts and certain procedures which can be used in the selective hydrogenation of the polymers of this invention.

The entire disclosures of the foregoing pending applications are incorporated herein by reference.

SUMMARY OF THE INVENTION

In accordance with this invention, novel, solid, precursor block copolymers are provided wherein the terminal blocks are a polymer of at least one hydrocarbon containing a 1,3-conjugated diene structure wherein the 2- and 3-carbon atoms are each additionally bonded to a hydrocarbyl side group and at least one interior block is a polymer of at least one hydrocarbon having a 1,3-conjugated diene structure wherein one of the 2- and 3-carbon atoms is additionally bonded to a hydrocarbyl side group and the other is additionally bonded to a hydrogen atom. The first named diene, exemplified by 2,3-dimethyl-1,3-butadiene (DMBD) may be termed a "D" monomer or unit, and a polymer of such diene constituting a block of the block copolymer of this invention may be termed a "D" polymer block, while the second-named diene, exemplified by isoprene may be termed an "I" monomer or unit and a polymer of such a diene, constituting a block of the block copolymer of the invention, as an "I" polymer block. A preponderance, e.g. at least about 51% of the polymerized "D" units are 1,4-units.

The invention also encompasses the selective hydrogenation of the foregoing polymers such that substantially all of the residual double bonds of the precursor I polymer blocks are hydrogenated so that the saturated I blocks then contribute excellent elastomeric properties to the polymer accompanied by a high degree of resistance to degradation by ozone and oxygen. Moreover, sufficient unsaturation remains in the D polymer blocks to provide a basis for subsequent vulcanization or cross-linking of the polymer. The precursor, unhydrogenated block polymers, the selectively hydrogenated block polymers, and the vulcanized or cross-linked polymers are all included within the scope of the invention.

Finally, the invention includes processes for the preparation of the foregoing block copolymers using techniques of anionic polymerization.

The selectively hydrogenated block copolymers of this invention contain sufficient unsaturation in the terminal D blocks so that they may be adequately vulcanized to provide near network perfection with the resulting superior mechanical properties at both room and elevated temperatures, while, as stated, the substantially complete lack of ethylenic unsaturation in the interior I blocks provides for a high degree of oxidative and thermal stability.

DETAILED DESCRIPTION OF THE INVENTION

General

The "D" diene monomer is defined by the following formula

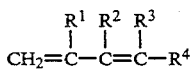  (1)

wherein $R^1$ and $R^2$ are hydrocarbyl, and $R^3$ and $R^4$ are hydrogen or hydrocarbyl. On being polymerized as described hereinafter the D monomer forms a chain of preponderantly 1,4-D units having the following formula if not hydrogenated

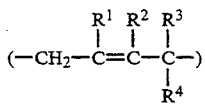  (2)

The "I" diene monomer is defined by the following formula

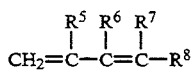  (3)

where one of $R^5$ or $R^6$ is hydrocarbyl while the other is hydrogen, and $R^7$ and $R^8$ are hydrogen or hydrocarbyl. On being polymerized as described hereinafter, the I monomer forms a chain of preponderantly 1,4-I units having the following formula before hydrogenation

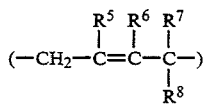  (4)

Linear block polymers under this invention may consist of alternating D and I polymer blocks, with the terminal blocks being D blocks. The simplest linear block copolymer contemplated is the triblock copolymer

  (a)

wherein "D" indicates a D polymer block, and "I" an I polymer block.

In some instances, it may be desirable to increase the resistance of the unvulcanized polymer to cold flow and/or increase the green strength of the polymer before vulcanization. This may be accomplished by introducing polymerized units of an aryl-substituted olefin, e.g., styrene, hereinafter referred to as an "S" monomer or polymerized "S" units, with the polymer of an aryl-substituted olefin constituting a block of the contemplated block copolymer being referred to as an "S" polymer block. In forming block copolymers containing polymerized S units, such S units may take the form of blocks of a random or tapered copolymer of D and S monomers (DS copolymer blocks) alternating with I polymer blocks, with the terminal blocks being the DS copolymer blocks. The simplest linear form of this type of polymer is the triblock copolymer

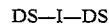  (b)

Alternatively the polymerized S units may take the form of separate S polymer blocks alternating with the D and I polymer blocks, with the terminal blocks being D polymer blocks. Examples of this type of polymer are the pentablock copolymers

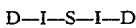  (c)

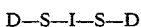  (d)

or the tetrablock copolymer

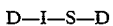  (e)

The polymerized S units in the foregoing polymers have the effect of raising the glass transition temperature of the overall polymer which in turn increases the resistance to cold flow and the green strength of the polymer before vulcanization.

In another embodiment of the invention, the resistance to cold flow and green strength of the unvulcanized selectively hydrogenated polymer are improved by incorporating into the precursor, unhydrogenated polymer at least one interior polybutadiene block composed of at least 80% of 1,4 units. When the block copolymer is subjected to selective hydrogenation, the foregoing polybutadiene blocks are hydrogenated to blocks composed primarily of straight chain polyethylene having a high degree of crystallinity. Such crystallinity of the polyethylene blocks has the effect of increasing the resistance to cold flow and the green strength of the polymer before vulcanization. The polymerized ethylene units are hereinafter referred to as "E" units, and the blocks composed primarily of polyethylene having a high degree of crystallinity are referred to as "E" polymer blocks. Since up to 20% of the polybutadiene blocks before hydrogenation may be polymerized 1,2-units, up to 20% of the E polymer blocks may consist of polymerized butene-1 units resulting from the hydrogenation of such 1,2-units.

Typical linear block copolymers contemplated under the invention containing E polymer blocks are the pentablock copolymers

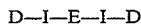  (f)

  (g)

and the tetrablock copolymer

  (h)

Also contemplated under the invention are star-branched polymers, the branches of which have a terminal block containing polymerized D units and at least one interior I polymer block. Optionally the branches may also contain for improvement of resistance to cold flow and green strength of the unvulcanized polymer, S units copolymerized with D units in the terminal block, at least one interior S polymer block, or at least one interior E polymer block. Typically, each of the branches of the star branched polymer may consist of any one of the following block copolymers

  (i)

  (j)

  (k)

  (l)

D—I—E— (m)

D—E—I—(n)

When the linear block copolymers and the branches of the star-branched block copolymers of this invention contain polymerized units limited only to D and I units, then such copolymers may contain a total of, for example, about 1 to 50 wt. %, preferably about 1 to 5 wt. % of D units, and about 50 to 99 wt. %, preferably about 95 to 99 wt. % of I units. This corresponds to an average total number of polymerized D units, i.e., in all the D-unit containing blocks of the linear copolymers or all the branches of the star-branched copolymers, per 100,000 of the number average molecular weight (Mn), of for example about 15 to 735, preferably about 30 to 370 and more preferably about 30 to 150, and an average total number of polymerized I units per 100,000 of Mn of, for example, about 370 to 1815, preferably 740 to 1815 and more preferably about 1111 to 1815.

When the block copolymers of the invention also contain polymerized S or E units, then such copolymer may contain about 1 to 49 wt. %, preferably about 1 to 25 wt. % of polymerized D units, about 50 to 98 wt %, preferably about 65 to 98 wt. % polymerized I units, and about 1 to 30 wt. %, preferably about 1 to 10 wt. % of polymerized S or E units. This corresponds to an average total number of polymerized D units, i.e., all the blocks of the linear block copolymers and in all the branches of the contemplated star-branched block copolymers, per 100,000 of the total number average molecular weight (Mn) of the block copolymer, of, for example, about 15 to 735, preferably about 30 to 370, and more preferably about 30 to 150; an average total number of polymerized I units, per 100,000 Mn of, for example, about 370 to 1815, preferably about 740 to 1815, and more preferably about 1111 to 1815, and an average total number of polymerized S or E units (polymerized ethylene and any butene-1 units present as a result of the presence of 1,2-polymerized butadiene units in the corresponding blocks of the unhydrogenated precursor polymer), per 100,000 Mn of, for example, about 37 to 1111, preferably about 74 to 1111, and more preferably about 148 to 1111. It should be noted that if the coupling technique is used to prepare the unhydrogenated precursors of block copolymers (a), (b), (c), (d), (f) or (g), then the average values of the number of D, I, S or E units will be the same for each block where two blocks composed of the applicable polymerized units are present in the copolymer. However, if a sequential polymerization technique is used, then the average value of the number of such units may be somewhat different for each of the two blocks containing the applicable polymerized units in any particular copolymer.

In formulas (2) and (4) showing the structure of polymerized D and I units containing residual double bonds, $R^1$, $R^2$, $R^3$, $R^4$, $R^5$ or $R^6$, $R^7$ and $R^8$ may all be hydrocarbyl groups. The structures containing residual double bonds in the D units defined by formula (2) and in the I units defined by formula (4) are the polymerized 1,4-units of the corresponding monomers, which in the case of the D polymer are necessary to produce precursor copolymers which can be selectively hydrogenated in the manner described herein to produce the selectively hydrogenated block copolymers of this invention.

The hydrocarbyl group or groups in formulas (1) to (4) are the same or different and they are substituted or unsubstituted alkyl, alkenyl, cycloalkyl, cycloalkenyl, aryl, alkaryl or aralkyl groups or any isomers thereof. Suitable hydrocarbyl groups are alkyls of 1-20 carbon atoms, alkenyls of 1-20 carbon atoms, cycloalkyls of 5-20 carbon atoms, cycloalkenyls of 5-20 carbon atoms, aryls of 6-12 carbon atoms, alkaryls of 7-20 carbon atoms or aralkyls of 7-20 carbon atoms. Examples of suitable alkyl groups are methyl, ethyl, propyl, butyl, pentyl, hexyl, heptyl, octyl, decyl, methyldecyl or dimethyldecyl. Examples of suitable alkenyl groups are ethenyl, propenyl, butenyl, pentenyl or hexenyl. Examples of suitable cycloalkyl groups are cyclohexyl or methylcyclohexyl. Examples of suitable cycloalkenyl groups are 1-, 2-, or 3-cyclohexenyl or 4-methyl-3-cyclohexenyl. Examples of suitable aryl groups are phenyl or diphenyl. Examples of suitable alkaryl groups are 4-methylphenyl (p-tolyl) or p-ethylphenyl. Examples of suitable aralkyl groups are benzyl or phenethyl.

Suitable conjugated dienes of formula (1) used to polymerize the D polymer or DS copolymer blocks are 2,3-dimethyl-1,3-butadiene; 2,3-dimethyl-1,3-pentadiene; 2,3-diethyl-1,3-pentadiene; 2,3-dimethyl-1,3-hexadiene; 2,3-diethyl-1,3-heptadiene; 2,3-dimethyl-1,3-octadiene and the like or mixtures thereof, and most preferably 2,3-dimethyl-1,3-butadiene (DMBD).

Suitable conjugated dienes of formula (3) used to polymerize the I polymer blocks are isoprene, myrcene, 2-phenyl-1,3-butadiene, 2-hexyl-1,3-butadiene, 2-benzyl-1,3-butadiene, 2-p-tolyl-1,3-butadiene or mixtures thereof, preferably isoprene or myrcene, and most preferably isoprene.

Suitable aryl-substituted olefins used to polymerize the S polymer blocks have the formula

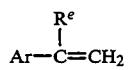

where Ar is phenyl, alkyl-substituted phenyl, naphthyl or alkyl-substituted naphthyl, and $R^e$ is hydrogen, methyl, ethyl, propyl, butyl or alkaryl. Examples of suitable aryl-substituted olefins are styrene, 2-phenyl alpha olefins such as alpha-methyl styrene, alkylated styrenes, vinyl naphthalene, or any alkylated vinyl naphthalenes. Suitable alkyl substituents in the alkylated styrenes or alkylated vinyl naphthalenes are methyl, ethyl, propyl, tert-butyl and sec-butyl. Each of the alkylated styrenes or vinyl naphthalenes may contain one or more alkyl substituents. Preferred aryl-substituted olefins are styrene, vinylnaphthalene, alpha-methyl styrene, vinyltoluene and most preferred is styrene.

The weight average molecular weight ($M_w$) of the block copolymers of this invention may be, for example, in the range of about 30K to $1.5 \times 10^6$ (where K=1000), preferably about 60K to $10^6$, and more preferably about 75K to 500K, while the number average molecular weight ($M_n$) may be, for example, in the range of about 20K to $10^6$, preferably about 40K to 750K, and more preferably about 75K to 500K.

Although the block copolymers of this invention have been exemplified by triblock copolymers (a) and (b), pentablock copolymers (c), (d), (f) and (g), and tetrablock copolymers (e) and (h), as described hereinbefore, such block copolymers may contain a larger number of blocks as long as the two conditions of the invention are met, viz., 1) that the terminal blocks are D polymers or DS copolymers and that there is at least one interior I polymer block. In particular, if the terminal blocks are a D polymer, the block copolymer may contain interior S polymer or E polymer blocks to provide improved resistance to cold flow and green strength of the unvulcanized polymer. Such copolymers with a larger number of blocks may also contain D polymer or random DS polymer blocks in the interior of the backbone of a linear copolymer or the branches of a star-branched copolymer so as to allow cross-linking to take place in the interior as well as the ends of the backbone or branches, with a controlled large distance between the cross-links of the block copolymer. However, the described triblock copolymer, pentablock copolymers and tetrablock copolymers are preferred. In any case, it is important to have the block copolymer terminated at each end with the D polymer or DS random or tapered copolymer blocks to assure that there are unsaturated groups at each end of the block copolymer enabling the block copolymer to be cross-linked or functionalized at the terminal ends thereof. The term "functionalized" is used herein to describe chemical modifications of the unsaturated groups to produce functional groups, the nature of which is described in detail below. The cross-linking of the functionalized and nonfunctionalized copolymer chains is conducted in a conventional manner and is also described below.

As is apparent from the foregoing description, the contemplated block copolymers of this invention are obtained by selectively hydrogenating an unhydrogenated precursor block copolymer containing either terminal D polymer or DS copolymer blocks which retain some of their unsaturation after selective hydrogenation, and interior I polymer blocks. Optionally the unhydrogenated block copolymer may also contain interior S polymer blocks or interior blocks of polybutadiene containing at least 80% of 1,4-units which on subsequent selective hydrogenation yield the substantially saturated E polymer blocks, the latter unhydrogenated block copolymers containing polymerized 1,4-butadiene units being the precursors, for example, of pentablock copolymers (f) and (g) and tetrablock copolymer (h).

On being subjected to a selective hydrogenation reaction, the polymerized I and butadiene units if present, of the unhydrogenated precursor block copolymer, whether linear or star-branched, are hydrogenated to such an extent that they contain substantially none of the original unsaturation, while the polymerized D units retain a sufficient amount of their original unsaturation to vulcanize or cure the block copolymer. Generally, for a block copolymer wherein the D units are polymerized from any of the monomers discussed above, the Iodine Number for the D units after the selective hydrogenation reaction is about 10 to about 100%, preferably about 25 to about 100%, more preferably about 50 to about 100%, and most preferably about 100% of the Iodine Number prior to the selective hydrogenation reaction. For the I and E polymer blocks, the Iodine Number is about 0 to about 10%, preferably about 0 to about 0.5%, of the Iodine Number prior to the selective hydrogenation reaction. The Iodine Number, as is known to those skilled in the art, is defined as the theoretical number of grams of iodine which will add to the unsaturation in 100 grams of olefin and is a quantitative measurement of unsaturation.

As stated, in the unhydrogenated precursor block copolymers of the invention, the microstructure of the polymerized D units is composed preponderantly, e.g, at least about 51% of 1,4-units, while the microstructure of the polybutadiene blocks which are precursors of the E blocks is at least 80% of 1,4-units. This is accomplished by carrying out the polymerization of these dienes in the absence of a large enough amount of polar compound which would cause the number of 1,4-units to fall below the foregoing minimums.

The selective hydrogenation of the precursor polymer and the catalyst utilized in carrying out the reaction are described in detail hereinafter. After the hydrogenation reaction is completed, the selective hydrogenation catalyst is removed from the block copolymer, and the polymer is isolated by conventional procedures, e.g., alcohol flocculation, steam stripping of solvent or non-aqueous solvent evaporation. An anti-oxidant, e.g., Irganox 1076 (from Ciba-Geigy), is normally added to the polymer solution prior to polymer isolation.

The isolated polymer is vulcanizable through the unsaturated terminal D units by a number of well known processes utilized currently for thermosetting hydrocarbon elastomers. Such processes are detailed in RUBBER TECHNOLOGY, THIRD EDITION, VAN NOSTRAND REINHOLD COMPANY, New York, 1987, Maurice Morton, Editor, chapters 2,9 and 10, incorporated herein by reference.

As stated, the star-branched block copolymers of this invention comprise a combination of D polymer or random or tapered DS copolymer blocks and I polymer blocks wherein the free end (i.e., uncoupled end) of each branch of the copolymer is a D polymer or DS copolymer block. When the free ends are a D polymer block, the branches may also contain interior S or E polymer blocks. Since each branch of the star-branched copolymer has only a single end, the advantages of the invention obtained as a result of unsaturated polymerized D units in the terminal blocks may be obtained by utilizing half the structure of triblock polymers (a) or (b) or pentablock polymers (c), (d), (f) or (g), as each branch of the star-branched polymer. Thus, one type of preferred polymer has branches composed of two blocks, viz., an outermost D polymer or DS random or tapered copolymer block and an interior I polymer block; a second preferred branch has branches composed of three blocks, viz., an outermost D polymer block, a central S or E polymer block and an innermost I polymer block; and a third preferred polymer has branches also composed of three blocks, viz., an outermost D polymer block, a central I polymer block and an innermost S or E polymer block.

The block copolymers of this invention having a particularly large number of polymerized D units in the terminal D polymer or DS random or tapered copolymer blocks (i.e., containing 100–200 monomer units) should have an increased vulcanization rate, as compared to those containing a smaller number of D units in the terminal blocks, and are co-vulcanizable with diene rubbers available in the art, e.g., polybutadiene and natural rubbers. The block polymers containing such large D blocks can be blended with diene rubbers by conventional methods and subsequently vulcanized to produce novel compositions of this invention. The resulting materials are expected to have increased oxidation and ozone degradation resistance as compared to known diene rubbers alone, and therefore are expected to be valuable materials for the production of white sidewalls of tires and similar articles.

In all embodiments of the invention, mixtures of D and I conjugated dienes may be used to form the D and I polymer blocks or the DS random or tapered copolymer blocks of the contemplated block copolymers. Accordingly, whenever a reference is made herein to a D or I conjugated diene, it may encompass more than one of such type of monomer or polymerized monomeric unit.

While the block copolymers of this invention have been described primarily in terms of polymerized D, I, S and E units in the various blocks, it is to be understood that controlled minor amounts of other monomers may be used when preparing the precursors of such blocks. Thus, a minor amount of any other anionically polymerizable monomer capable of polymerizing with such indicated monomers, which does not interfere with the process or properties of the desired polymer may be incorporated in the polymer.

It will be apparent to those skilled in the art that proper choice of polymerization parameters can produce polymers with a great variety of compositional and structural differences, falling within the scope of our invention. For example, changes in composition of the interior I, S and E polymer blocks or the polymerized S units in the random or tapered DS copolymer blocks control the nature of the rubbery properties while changes in the D polymer terminal blocks or the polymerized D units in the random or tapered DS copolymer terminal blocks permit response to different vulcanizing agents, e.g., sulfur-based cure systems and phenolic resin cure systems.

Blends Of Inventive Polymers With Other Materials

The block copolymers of this invention can be blended with other rubbers, in which case the degree of unsaturation of the copolymers of the invention can be adjusted so that the vulcanization rate of the two materials is substantially the same. Suitable rubbers which can be blended with the copolymers of this invention are EPDM, butyl rubber and rubbers based on butadiene or isoprene.

The block copolymers of this invention can also be blended with plastics, e.g., isotactic polypropylene, polystyrene, polyethylene, Nylon, polycarbonates, polyesters and styrene-acrylonitrile resins. Thermoplastic elastomers having excellent properties can be obtained by dynamically vulcanizing a blend of polypropylene and the elastomers of our invention, in which the elastomers are cross-linked to a very high degree. A commercial material, Santoprene (trademark of and produced by Monsanto Chemical Co.) is based upon blends of polypropylene and EPDM. Details of the preparation and properties of such blends are presented in THERMOPLASTIC ELASTOMERS, A COMPREHENSIVE REVIEW, edited by N. R. Legge et al., Chapter 7, Hanser Publishers, Munich, Vienna and New York (1987), the contents of which are incorporated herein by reference. Such dynamically vulcanized blends prepared with the polymers of the invention in a conventional manner, e.g., that of N. R. Legge et al., wherein the polymers of this invention are blended with polypropylene, and most particularly wherein the linear triblock and pentablock polymers of this invention are blended with polypropylene, can provide thermoplastic elastomers with unique elastomeric properties.

The block copolymers of this invention can be compounded with ingredients known to those skilled in the art, e.g., fillers such as silica, carbon black, extender oils, anti-oxidants, tackifying agents, vulcanizing agents and similar materials.

Polymerization Reaction

The precursor block copolymers of this invention are polymerized by an anionic polymerization process. Anionic polymerization is well known in the art, and it is utilized in the production of a variety of commercial polymers. An excellent comprehensive review of the anionic polymerization processes appears in the text ADVANCES IN POLYMER SCIENCE 56, ANIONIC POLYMERIZATION, pp. 1-90, Springer-Verlag, Berlin, Heidelberg, New York, Tokyo 1984 in a monograph entitled ANIONIC POLYMERIZATION OF NON-POLAR MONOMERS INVOLVING LITHIUM, by R. N. Young, R. P. Quirk and L. J. Fetters, incorporated herein by reference. The anionic polymerization process is conducted in the presence of a suitable anionic catalyst (also known as an initiator), such as n-butyl-lithium, sec-butyl-lithium, t-butyl-lithium, sodium naphthalide or cumyl potassium. The amount of the catalyst and the amount of the monomer in the polymerization reaction dictate the molecular weight of the polymer. The polymerization reaction is conducted in solution using an inert solvent as the polymerization medium, e.g., aliphatic hydrocarbons, such as pentane, hexane, cyclohexane or heptane, or aromatic solvents, such as benzene or toluene.

The process, when using a lithium-based catalyst, comprises forming a solution of the DMBD monomer in an inert hydrocarbon solvent, such as cyclohexane. The process is carried out in the presence of a low enough level of polar compound to produce no more than about 20% 1,2-D units, and, where the presence of E blocks is desired, no more than about 20% 1,2-butadiene units. The class of polar compounds which when present in sufficient amount, increases the number of polymerized 1,2-units in favor of 1,4-units, is described in previously cited U.S. Pat. Nos. 5,187,236, 5,292,820 and 5,276,100.

In forming, for example, the triblock and pentablock copolymers of this invention, an alkyl lithium-based initiator and a D diene, e.g., DMBD, monomer are combined in an inert solvent in the absence of any appreciable amount of polar compound, and polymerization of the DMBD proceeds to produce the first terminal block whose molecular weight is determined by the ratio of the DMBD to the initiator. The "living" poly(DMBD) anion formed in this first step, which is composed preponderantly of 1,4-units because of the absence of an appreciable amount of polar compound, is utilized as the catalyst for further polymerization. At this point, an I monomer, e.g. isoprene, is introduced into the system and the resulting product is a living D-I diblock polymer having a terminal anion and a lithium counterion, which, if coupled with an appropriate coupling agent, yields triblock copolymer (a) having the structure D-I-D. If the foregoing procedure is followed except that the first polymerization is carried out with a mixture of DMBD and an arylsubstituted olfein, e.g., styrene, the first living anion formed will be a DS random or tapered copolymer. When this anion is used to polymerize isoprene, a living DS-I diblock polymer will be formed which can be coupled to form triblock copolymer (b) having the structure DS-I-DS. Alternatively, the living D-I diblock polymer can be used to further polymerize an aryl-substituted olefin, e.g., styrene, or butadiene to form living triblock copolymer D-I-S-or D-I-1,4-butadiene which can be coupled to form pentablock copolymer (c) having the structure D-I-S-I-D, or copolymer (f) having the structure (after selective hydrogenation) D-I-E-I-D. Finally, the order of polymerization of isoprene and styrene or butadiene may be reversed to yield living triblock polymers D-S-I-, or D-1,4-butadiene-I-, which after coupling yield pentablock copolymer (d) having the structure D-S-I-S-D or (g) having the structure (after selective hydrogenation) D-E-I-E-D.

The polymerization reaction is usually conducted at a temperature of between 0° C. and about 100° C., although higher temperatures can be used.

In many cases, the reaction temperature will be, for example, from 50° to 80° C. The reaction pressure is not critical and varies from atmospheric to about 100 psig.

The use of the coupling technique for the production of triblock and pentablock polymers greatly reduces the reaction time necessary for the completion of polymerization, as compared to a sequential addition of monomers utilized to prepare each block. Such coupling techniques are well known and utilize coupling agents, such as esters, $CO_2$, iodine, dihaloalkanes, silicon tetrachloride, divinyl benzene, alkyltrichlorosilanes and dialkyldichlorosilanes. The use of tri- or tetra-functional coupling agents, such as alkyltrichlorosilanes or silicon tetrachloride, permits the formation of macromolecules having 1- or 2- main chain branches, respectively. The addition of divinyl benzene as a coupling agent has been documented to produce molecules having up to 20 or more separately joined segments.

The use of some of the coupling agents provides a convenient means of producing star-branched block polymers. The star-branched block polymers are made from any combination of blocks D, I, and S or E, or random or tapered DS and I, discussed hereinbefore, providing that each free end (i.e., uncoupled end) of the star-branched polymer is either a D or a random or tapered DS block, respectively. The molecular weight of the star-branched block copolymers will depend on the number of branches in each such copolymer, as will be apparent to those skilled in the art.

Suitable coupling agents and reactions are disclosed in the following references which are incorporated herein by reference: U.S. Pat. Nos. 3,949,020; 3,594,452; 3,598,887; 3,465,065; 3,078,254; 3,766,301; 3,632,682; 3,668,279; and British patents 1,014,999; 1,074,276; 1,121,978.

Selective Hydrogenation

The precursor block copolymer is selectively hydrogenated to saturate the interior I block and, if present, the polybutadiene blocks. The method of selectively hydrogenating the I blocks is similar to that of Falk, "Coordination Catalysts For The Selective Hydrogenation of Polymeric Unsaturation", JOURNAL OF POLYMER SCIENCE: PART A-1, Volume 9, 2617–2623 (1971), and may be conducted with the hydrogenation catalyst and process used herein. Any other known selective hydrogenation methods may also be used, as will be apparent to those skilled in the art, but it is preferred to use the method described herein. In summary, the selective hydrogenation method preferably used herein comprises contacting the previously prepared block copolymer with hydrogen in the presence of the disclosed catalyst composition.

The hydrogenation catalyst composition is described in previously discussed application Ser. No. 07/466,136, filed Jan. 16, 1990, by T. S. Coolbaugh et al. The hydrogenation catalyst composition is synthesized from at least one transition metal compound and an organometallic reducing agent.

Suitable transition metal compounds are compounds of metals of Group IVb, Vb, VIb, or VIII, preferably IVb or VIII of the Periodic Table of the Elements, published in LANGE's HANDBOOK OF CHEMISTRY (13th Edition, 1985, McGraw-Hill Book Company, New York, John A. Dean, Editor). Non-limiting examples of such compounds are metal halides, e.g., titanium tetrachloride, vanadium tetrachloride; vanadium oxytrichloride, titanium and vanadium alkoxides, wherein the alkoxide moiety has a branched or unbranched alkyl radical of 1 to about 20 carbon atoms, preferably 1 to about 6 carbon atoms. Preferred transition metal compounds are metal carboxylates or alkoxides of Group IVb or VIII of the Periodic Table of the Elements, such as nickel (II) 2-ethylhexanoate, titanium isopropoxide, cobalt (II) octoate, nickel (II) phenoxide and ferric acetylacetonate.

The organometallic reducing agent is any one or a combination of any of the materials commonly employed to activate Ziegler-Natta olefin polymerization catalyst components containing at least one compound of the elements of Groups Ia, IIa, IIb, IIIa, or IVa of the Periodic Table of the Elements. Examples of such reducing agents are metal alkyls, metal hydrides, alkyl metal hydrides, alkyl metal halides, and alkyl metal alkoxides, such as alkyllithium compounds, dialkylzinc compounds, trialkylboron compounds, trialkylaluminum compounds, alkylaluminum halides and hydrides, and tetraalkylgermanium compounds. Mixtures of the reducing agents may also be employed. Specific examples of useful reducing agents include n-butyl-lithium, diethylzinc, di-n-propylzinc, triethylboron, diethylaluminumethoxide, triethylaluminum, trimethylaluminum, triisobutylaluminum, tri-n-hexylaluminum, ethylaluminum dichloride, dibromide, and dihydride, isobutyl aluminum dichloride, dibromide, and dihydride, diethylaluminum chloride, bromide, and hydride, di-n-propylaluminum chloride, bromide, and hydride, diisobutylaluminum chloride, bromide and hydride, tetramethylgermanium, and tetraethylgermanium. Organometallic reducing agents which are preferred are Group IIIa metal alkyls and dialkyl metal halides having 1 to about 20 carbon atoms per alkyl radical. More preferably, the reducing agent is a trialkylaluminum compound having 1 to about 6 carbon atoms per alkyl radical. Other reducing agents which can be used herein are disclosed in Stevens et al., U.S. Pat. No. 3,787,384, column 4, line 45 to column 5, line 12 and in Strobel et al., U.S. Pat. No. 4,148,754, column 4, line 56 to column 5, line 59, the entire contents of both of which are incorporated herein by reference. Particularly preferred reducing agents are metal alkyl or hydride derivatives of a metal selected from Groups Ia, IIa and IIIa of the Periodic Table of the Elements, such as n-butyl-lithium, sec-butyl-lithium, n-hexyl-lithium, phenyl-lithium, triethylaluminum, tri-isobutylaluminum, trimethylaluminum, diethylaluminum hydride and dibutylmagnesium.

The molar ratio of the metal derived from the reducing agent to the metal derived from the transition metal compound will vary for the selected combinations of the reducing agent and the transition metal compound, but in general it is about 1:1 to about 12:1, preferably about 1.5:1 to about 8:1, more preferably about 2:1 to about 7:1 and most preferably about 2.5:1 to about 6:1. It will be apparent to those skilled in the art that the optimal ratios will vary depending upon the transition metal and the organometallic agent used, e.g., for the trialkylaluminum/nickel(II) systems the preferred aluminum: nickel molar ratio is about 2.5:1 to about 4:1, for the trialkylaluminum/cobalt(II) systems the preferred aluminum: cobalt molar ratio is about 3:1 to about 4:1 and for the trialkylaluminum/titanium(IV) alkoxides systems, the preferred aluminum: titanium molar ratio is about 3:1 to about 6:1.

In all embodiments of the hydrogenation catalyst synthesis, it is preferred to use solutions of the reducing agent and the transition metal compound in suitable solvents, such as hydrocarbon solvents, e.g., cyclohexane, hexane, pentane, heptane, benzene, toluene or mineral oils. The solvents used to prepare the solutions of the reducing agent and of the transition metal compound may be the same or different, but if they are different, they must be compatible with each other so that the solutions of the reducing agent and the transition metal compound are fully soluble in each other.

The hydrogenation process comprises contacting the unsaturated polymer to be hydrogenated with an amount of the catalyst solution containing about 0.1 to about 0.5, preferably about 0.2 to about 0.3 mole percent of the transition metal based on moles of the polymer unsaturation. The hydrogen partial pressure is about 50 psi to about several hundred psi, but preferably it is about 100 to about 300 psi. The temperature of the hydrogenation reaction mixture is about 25° to about 80° C., since higher temperatures may lead to catalyst deactivation. The length of the hydrogenation reaction may be as short as 30 minutes and, as will be apparent to those skilled in the art, depends to a great extent on the actual reaction conditions employed. The hydrogenation process may be monitored by any conventional means, e.g., infra-red spectroscopy, hydrogen flow rate, total hydrogen consumption, or any combination thereof.

After the hydrogenation reaction is completed, the hydrogenation catalyst must be removed from the polymer, for example, by washing twice with equal volumes of 10% aqueous citric acid solution also containing 5% isopropanol at 60° C. The polymer solution is then water washed and the polymer isolated by conventional methods, e.g., steam or alcohol flocculation or solvent evaporation.

Cross-linking And Functionalization Of The Terminal Blocks

In addition to acting as sites for vulcanization, the unsaturated terminal blocks of the block polymers of this invention can be chemically modified to provide benefits obtained with similar modifications of existing commercial materials, such as butyl rubber or EPDM. In some instances, the benefits obtained by a chemical modification of butyl rubber or EPDM may be magnified using the elastomers of our invention as a matrix instead of the butyl rubber or EPDM because of their intrinsically superior elastomeric properties.

An example of such a chemical modification of the polymers of this invention is sulfonation of the olefinic unsaturation of the polymerized D units, i.e., polymerized dienes of formula (1) of any polymers of this invention containing such polymerized D units, followed by neutralization of the thus formed polymeric sulfonic acid with metal ions or amines. When such a modification is performed on a commercial ethylene-propylene-diene monomer (EPDM) rubber, a thermoplastic elastomer which behaves like a vulcanized rubber at room temperature but can be shaped at higher temperatures is produced. A description of an example of a process for and product description of such a chemically modified EPDM can be found in IONS IN POLYMERS, Advances in Chemistry Series 187, American Chemical Society, Washington, D.C. 1980, pp. 3–53, incorporated herein by reference. Following the procedures used for EPDM described in the aforementioned publication with the block copolymers of our invention, thermoplastic elastomers with greatly improved elongation properties were prepared.

It is known that the halogenation of the unsaturation in butyl rubber (based upon isoprene monomer) prior to the vulcanization treatment, produces dramatic changes in vulcanization rate and provides greater versatility in the choice of vulcanizing agents. Since the residual unsaturated groups in the block copolymers of our invention present in the polymerized D units have reactability similar to those of the unsaturated polyisoprene units in butyl rubber, the halogenation of the polymer of this embodiment provides the same benefits, but with the retention of the greater elongation characteristics inherent in the invention polymer.

It is also known that the reaction of EPDM with maleic anhydride at elevated temperatures (e.g., about 150° C. to about 250° C.) produces maleic modified EPDM which is used commercially as an impact modifier, particularly for Nylon. Similar modification of the polymers of our invention can be made to occur by employing the residual D unit unsaturation. The resultant impact modifier, because of its greater elongation, provides superior properties when blended with Nylon.

EPDM polymers which have been modified with polar functionality are utilized as dispersant type viscosity index improvers in multigrade lubricants. A great number of patents are devoted to such modifications. Any of the modifications performed on EPDM for this purpose can be performed with the polymers of this invention. Typical modifications which can be used with the polymers of this invention are described in: U.S. Pat. Nos. 3,099,644; 3,257,349; 3,448,174; 3,997,487; 3,870,841; 3,642,728; 3,847,854; 3,437,556; 4,557,849; 4,032,700; 3,899,434; 4,557,847; 4,161,452; 4,170,562; 4,517,104; 4,320,017; 4,502,972; 4,098,710; 4,007,121; 4,011,380; 4,033,888; 4,145,298; 4,402,844; 4,146,489 and British patent 1,072,796, the disclosures of all of which are incorporated herein by reference.

The above examples illustrate only some of the potentially valuable chemical modifications of the polymers of this invention. The high molecular weight block polymers of this invention, providing a means for a wide variety of chemical modifications only at the ends of the molecule (i.e., at the D polymer or random or tapered DS copolymer blocks only), present the opportunity to prepare materials previously impossible because of the lack of availability of such polymers. Some examples of well known chemical reactions which can be performed on polymers of this invention are found in E. M. FETTES, CHEMICAL REACTIONS OF POLYMERS, High Polymers, Vol. 19, John Wiley, New York, 1964, incorporated herein by reference.

Our invention provides block hydrocarbon polymers capable of being vulcanized to a perfect network with a distance between cross-links substantially equivalent to the dimensions of the unvulcanized elastomeric molecule. In addition to the expected improvements in elastomeric properties, the saturated main chain of the polymers of our invention provides a high degree of oxidative and thermal stability. Unique materials can also be obtained by chemical modifications of the block polymers of this invention, since such modifications can be carried out selectively only at the unsaturated terminal ends of the molecules.

The cross-linking of the selectively hydrogenated block polymers of this invention is conducted in a conventional manner by contacting the block copolymer with a suitable cross-linking agent or a combination of such agents. The cross-linking process produces a copolymer having uniform distance between cross-links.

The block copolymers can also be functionalized by reacting the terminal blocks containing unsaturated groups with various reagents to produce functional groups, such as formyl, hydroxyl, epoxy, sulfonic acid, mercapto, acrylate or carboxyl groups. Several of these materials may be further reacted with polyamines or polyols to provide polymers that may be utilized as dispersants or dispersant VI improvers. Functionalization methods are well known in the art.

The block copolymers, including the star-branched polymers, of this invention can be used in a variety of applications, e.g., to produce electrical insulation, pressure sensitive adhesives, sealants, rubberized asphalts, in automotive applications, e.g., hoses, tubing, weatherstripping, in construction industry, e.g., to produce gaskets, rubber sheeting for roofing, pond and ditch liners, and in many other applications.

The following examples further illustrate additional features of the invention. However, it will be apparent to those skilled in the art that the specific reactants and reaction conditions used in the examples do not limit the scope of the invention.

In all of the following examples, the experimental work was performed with dried reactors and equipment and under strictly anaerobic conditions. Extreme care must be used to exclude air, moisture and other impurities capable of interfering with the delicate chemical balance involved in the synthesis of the polymers of this invention, as will be apparent to those skilled in the art.

EXAMPLE 1

This example illustrates the preparation of a polymer of the type of triblock copolymer (a) having the structure D-I-D, where the D blocks are a homopolymer of 2,3-dimethyl-1,3-butadiene (DMBD) and the I block is a homopolymer of isoprene, and wherein over 80% of the polymerized D units have the 1,4-microstructure.

Eleven hundred milliliters (ml) of purified pentane were introduced under nitrogen atmosphere into a two-quart glass bowled stirred pressure reactor equipped with an air-driven stirrer, a pressure gauge, a thermometer well, a heat exchange coil, a top surface inlet valve, a dip tube feeder with valve, a syringe injection port containing a Viton rubber gasket and a blow-out disk (200 psi). One ml of a solution that was 0.1M in dipyridyl and 0.01M in tetrahydrofuran was injected into the reactor along with 11.0 ml (8.00 g, 0.0974 mol) of DMBD. The solution was heated to 55° C. and titrated by slow addition of 1.6M n-butyllithium until a yellow color persisted. Next, 1.1 ml of t-butyllithium was added. Polymerization of the DMBD was allowed to proceed for 8 hours. To the solution of the living anion was added 101.2 ml of isoprene via cannula, which had been dried by distilling from sodium. After another 4 hours, the diblock living anion was coupled to give a triblock having twice the molecular weight of the diblock by introduction of 6.7 ml of tetrahydrofuran and 5.0 ml of a 0.2M phenyl benzoate solution in cyclohexane. A portion of the polymer was isolated by flocculation in isopropanol containing Irganox 1076 and dried in a vacuum oven. Gel permeation chromatography of the sample showed the polymer to have a number average molecular weight (Mn) of 103,090 and a weight average molecular weight (Mw) of 106, 183, respectively, and a polydispersity index (Mw/Mn) of 1.03.

EXAMPLE 2

This example illustrates another preparation of triblock copolymer (a) having the structure D-I-D wherein the D blocks are poly (DMBD) comprising over 80% of 1,4 units and the I block is polyisoprene.

A clear, dry 600 ml high pressure reaction bottle containing a stir bar was charged with 481 grams of cyclohexane and 6.2 ml of DMBD. The vessel was capped with a crown cap and rubber gasket protected by a layer of Teflon tape or paper using an ordinary bottle capper. The metal cap possessed two small holes where a syringe needle or cannula could be inserted. The contents were stirred and warmed to 55° C. and then titrated with n-butyllithium to a dipyridyl end point. Polymerization was initiated by the addition of 0.660 ml of a 1.7M solution of t-butyllithium. The reaction was allowed to proceed for 12 hours after which time 52.9 ml of isoprene which had been freshly distilled from sodium metal was cannulaed into the reaction. Polymerization of the isoprene onto the DMBD block proceeded over a 7 hour period. DMBD (6.2 ml) which had been distilled from sodium was cannulaed into the reaction and polymerized for 8 hours. The living anion was then quenched via the addition of 0.05 ml of degassed acetic acid. A portion of the unhydrogenated triblock polymer was isolated by flocculation in isopropanol containing the antioxidant Irganox 1076 to prevent crosslinking of the highly unsaturated triblock. The solid polymer sample was dried in a vacuum oven for 12 hours. FTIR analysis revealed the existence of both vinylidene (888 $cm^{-1}$) and trisubstituted (836 $cm^{-1}$) olefins. Gel permeation chromatography of the sample, using DAWN laser light scattering dual detectors, determined the number average molecular weight (Mn) and the weight average molecular weight (Mw) of the polymer to be 51, 387 and 55, 568, respectively, for a polydispersity index (Mw/Mn) of 1.08.

Example 3

This example illustrates the selective hydrogenation of the triblock copolymer of Example 2 using an aluminum cobalt soluble catalyst.

A Paar high pressure reactor was charged with 312 grams of pentane containing 27 grams of the dissolved triblock polymer of Example 3 via a cannula. This amount of polymer represents 0.347 moles of polyisoprene unsaturation. The reactor was then evacuated and flushed with nitrogen several times. The hydrogenation catalyst (3.0 ml) was added via syringe. The catalyst was prepared by adding 47.5 ml of a 1.7M solution of triethylaluminum in cyclohexane to a cooled solution of 20.2 mmoles of cobalt octoate dissolved in 145 ml of cyclohexane. The triethylaluminum was added slowly (over a 1.5 hour period) under a nitrogen atmosphere using an addition funnel. The final catalyst solution was 0.1M in cobalt and had an Al/Co ratio of 4:1. After the catalyst was added, the reactor was purged 4 times with hydrogen gas then heated to 40° C. and pressured to 200 psi with hydrogen. Analysis of an aliquot of the product taken after 1.5 hours demonstrated complete loss of the absorptions related to the vinylidene (888 cm$^{-1}$) and the trisubstituted (836 cm$^{-1}$) double bonds of the isoprene. The reaction mixture was then treated with several drops of hydrogen peroxide and 150 ml of a 10% citric acid solution, and was heated to 65° C. for 1.5 hours. The aqueous layer was then removed and the wash step was repeated. The pentane solution was then treated with antioxidant (Irganox 1076). A small portion of polymer, precipitated in the usual way, was used for analysis. Examination of the proton NMR revealed that virtually all of the tetra-substituted double bonds in the polymerized DMBD remained. GPC of the sample revealed little change in the polydispersity index.

The foregoing selectively hydrogenated triblock copolymer can be vulcanized by means of standard techniques such as accelerated sulfur cures, peroxide cures and resin cures to produce a vulcanizate having a superior balance of viscoelastic and stability properties.

The procedures of Examples 1 to 3 can also be used to form a triblock copolymer (b) having the structure DS-I-DS where the DS blocks are random or tapered copolymers of DMBD and styrene and I is polyisoprene, by utilizing in the first polymerization step a mixture of DMBD and styrene rather than DMBD alone as monomer.

Example 4

This example illustrates the preparation of pentablock copolymer (c) having the structure D-I-S-I-D where the D blocks are poly(DMBD), the I blocks are polyisoprene and the S block is polystyrene.

A clear, dry 600 ml high pressure reaction bottle containing a stir bar was charged with 481 grams of cyclohexane and 11.0 ml. of DMBD. The vessel was capped with a crown cap and rubber gasket protected by a layer of Teflon tape or paper, using an ordinary bottle capper. The metal cap possessed two small holes where reactants could be added via syringe or cannula. The contents were stirred and warmed to 55° C. and then titrated with n-butyllithium to a dipyridyl end point. Polymerization was initiated by the addition of 0.600 ml of a 1.7M solution of t-butyllithium. The reaction was allowed to proceed for 12 hours after which time 50.0 ml of isoprene which had been freshly distilled from sodium metal was cannulaed into the reaction. Polymerization of the isoprene onto the DMBD block proceeded over a six hour period. Styrene (3.3 ml) which had been purified by passing it through alumina was syringed into the reaction and allowed to polymerize for 12 hours. The formed triblock was then coupled via the addition of 0.310 ml of a 10% solution of dichlorodimethylsilane (0.510 mmoles) in cyclohexane. After coupling was complete, a portion of the unhydrogenated pentablock polymer was isolated by flocculation in isopropanol containing an antioxidant Irganox 1076 to prevent crosslinking of the highly unsaturated triblock. The solid polymer sample was dried in a vacuum oven for 12 hours. Gel permeation chromatography of the sample, using the DAWN laser light scattering dual detectors, showed the number average molecular weight (Mn) and the weight average molecular weight (Mw) of the polymer to be 85,915 and 114,469, respectively.

The dried polymer of the example exhibited a considerably reduced tendency to flow, even at elevated temperatures, than the polymer of Example 2.

The polymer of this example can be hydrogenated as shown in Example 3 to produce vulcanizable polymers having increased resistance to cold flow, which can be formed into articles which, after vulcanization, have superior mechanical properties and stability.

Example 5

This example illustrates the formation of pentablock copolymer (d) having the structure D-S-I-S-D wherein the D blocks are poly(DMBD), the S blocks are polystyrene, and the I block is polyisoprene.

A clear, dry 600 ml high pressure reaction bottle containing a stir bar was charged with 481 grams of cyclohexane and 11.0 ml of DMBD. The vessel was capped with a crown cap and rubber gasket protected by a layer of Teflon tape or paper, using an ordinary bottle capper. The metal cap possessed two small holes where reactants could be added via syringe or cannula. The contents were stirred and warmed to 55° C. and then titrated with n-butyllithium to a dipyridyl end point. Polymerization was initiated by the addition of 0.600 ml of a 1.7M solution of t-butyllithium. The reaction was allowed to proceed for 12 hours after which time 6.6 ml of styrene which had been purified by passing it through alumina was syringed into the reaction. Polymerization of the styrene onto the DMBD block proceeded for a six hour period. Isoprene (45.5 ml) which had been dried by freshly distilling it from sodium was cannulaed into the reaction and allowed to polymerize for 12 hours. The formed triblock was then coupled via the addition of 0.310 ml of a 10% solution of dichlorodimethylsilane (0.510 mmoles) in cyclohexane. After coupling was complete, a portion of the unhydrogenated pentablock polymer was isolated by flocculation in isopropanol containing an antioxidant Irganox 1076 to prevent crosslinking of the highly unsaturated triblock. The solid polymer sample was dried in a vacuum oven for 12 hours. Gel permeation chromatography of the sample, using the DAWN laser light scattering dual detectors, determined the number average molecular weight (Mn) and the weight average molecular weight (Mw) of the polymer to be 97,850 and 106,630, respectively with a polydispersity index of 1.09.

Example 6

This example illustrates the selective hydrogenation of the pentablock copolymer of Example 5 to remove substantially all the unsaturation of the I block while leaving the S blocks substantially intact and with enough unsaturation remaining in the D blocks to provide sufficient sites for subsequent vulcanization or chemical modification.

A Paar high pressure reactor was charged with 290 grams of cyclohexane containing 44 grams of dissolved pentablock polymer of Example 5 via vacuum suction through Teflon tubing. This amount of polymer represents 0.445 moles of isoprene units of unsaturation. The reactor was evacuated and flushed several times with nitrogen. The reactor contents were heated to 30° C. and 5.0 ml of the hydrogenation catalyst (5.0 ml) was added via syringe. The catalyst was prepared by adding 47.5 ml of a 1.7M solution of triethylaluminum in cyclohexane. The triethylaluminum was added slowly (over a 2 hours period) under a nitrogen atmosphere using an addition funnel. The final catalyst solution was 0.1M in cobalt and had an Al/Co ratio of 4:1. After the catalyst was added, the reactor was purged 4 times with hydrogen gas, pressured to 200 psi with hydrogen and heated to 40° C. Every 45 minutes an additional 3.0 ml of catalyst was added to the reaction, totalling an extra 9.0 ml. Analysis of an aliquot of the reaction mixture after 2.5 hours using the FTIR showed complete disappearance of the absorptions related to the vinylidene (888 cm$^{-1}$) and the trisubstituted (836 cm$^{-1}$) double bonds of the isoprene. The reaction mixture was then heated to 65° C. with 1 ml of hydrogen peroxide and 150 ml of a 10% citric acid solution for 1.5 hours. The aqueous layer was then removed and the wash step was repeated. A small portion of the Irganox 1076 antioxidant was added. The polymer was isolated in the usual way. Examination of the proton NMR revealed that virtually all of the tetrasubstituted double bonds in the poly(DMBD) blocks remained. A GPC of the sample revealed little change in the polydispersity index of the polymer had occurred as a result of the hydrogenation.

The selectively hydrogenated polymer of this example is a vulcanizable polymer having superior elastomeric and stability characteristics. Moreover, it has excellent unvulcanized strength and resistance to cold flow when compared with the polymer of Example 3.

Example 7

This example illustrates the preparation of pentablock copolymer (f) having the structure D-I-E-I-D wherein the D blocks are poly(DMBD), the I blocks are polyisoprene, and the E block before selective hydrogenation is a polybutadiene having at least about 80% of 1,4-units and after hydrogenation is an essentially straight chain polyethylene.

A clear dry 600 ml high pressure reaction bottle containing a stir bar was charged with 375 ml of cyclohexane and 7.4 ml of DMBD. The vessel was capped with a crown cap and rubber gasket protected by a layer of Teflon tape or paper. The metal cap possessed two small holes where reactants may be added via syringe or cannula. The contents were stirred and warmed to 55° C. and then titrated with n-butyllithium to a dipyridyl end point. Polymerization was initiated by the addition of 0.600 ml of a 1.7M solution of t-butyllithium. The reaction was allowed to proceed for 15 hours after which time 31.7 ml of isoprene, freshly distilled from sodium metal, was cannulaed into the reaction. Polymerization of the isoprene onto the DMBD block proceeded over an 8 hour period. Butadiene (4.8 ml) which had been passed through molecular sieves and alumina was pressured into the reaction vessel and polymerized for 13 hours. The formed triblock was coupled via the addition of 1.8 ml of a 0.28M phenyl benzoate solution. Antioxidant Irganox 1076 was added to the solution to prevent crosslinking. A portion of the pentablock polymer was isolated for spectroscopic evaluation by flocculation in isopropanol. The solid polymer sample was dried in a vacuum oven for 12 hours. Gel permeation chromatography of the sample, using the DAWN laser light scattering dual detectors, determined the number average molecular weight (Mn) and the weight average molecular weight (Mw) of the polymer to be 71,080 and 78,850, respectively, for a polydispersity index (Mw/Mn) of 1.11. The infrared spectrum possessed the characteristic peaks for the olefins of 1,4-butadiene (967 cm$^{-1}$) 1,4-isoprene (837 cm$^{-1}$), and 3,4-isoprene (889 cm$^{-1}$).

Example 8

This example shows the selective hydrogenation of the pentablock copolymer of Example 7.

A Paar high pressure reactor was charged with 290 grams of cyclohexane containing 28 grams of dissolved pentablock polymer of Example 8, via vacuum suction through Teflon tubing. This amount of polymer represents 0.296 moles of isoprene unsaturation and 0.0518 moles of butadiene unsaturation in the polyisoprene and polybutadiene portions of the pentablock. The reactor was evacuated and flushed several times with nitrogen. The reactor's contents were heated to 30° C. and the hydrogenation catalyst (3.5 ml) was added via syringe. The catalyst was prepared by adding 47.5 mol of a 1.7M solution of triethylaluminum in cyclohexane. The triethylauminum was dripped (over a 2 hour period) under a nitrogen atmosphere using an addition funnel. The final catalyst solution was 0.1M in cobalt and had an Al/Co ratio of 4:1. After the catalyst was added, the reactor was purged 4 times with hydrogen gas, pressured to 200 psi with hydrogen, and heated to 40° C. After 1 hour, an additional 3.0 ml of catalyst was added. Analysis of an aliquot of the reaction mixture after 2 hours using the FTIR showed complete disappearance of the peaks which correspond to disubstituted (966 cm$^{-1}$), trisubstituted (836 cm$^{-1}$) and vinylidene (888 cm$^{-1}$) olefins. The reaction mixture was then heated with 1 ml of hydrogen peroxide and 150 ml of a 10% citric acid solution to 65° C. for 1.5 hours. The aqueous layer was removed and the wash step was repeated. Irganox 1076 was added to the polymer solution. Gel permeation chromatography of the sample revealed that little change in the polydispersity index of the polymer had occurred during hydrogenation.

The polymer was isolated from the organic layer by flocculation in isopropanol containing antioxidant. The isolated polymer was a tough, vulcanizable, elastomeric product, similar to that described in Example 3 but with much reduced cold flow as the result of polyethylene type crystallinity provided when the incorporated 1,4-polybutadiene block is saturated.

The procedures of Examples 7 and 8 can be used to form pentablock copolymer (g) having the structure D-E-I-E-D by reversing the order of polymerization of the isoprene and butadiene in forming the initial triblock living polymer before coupling.

Example 9

This example illustrates the preparation of tetrablock copolymer (h) having the structure D-I-E-D, where the D, I and E blocks are the same as described in Example 8, by sequential addition of monomers to form the respective blocks.

A clear, dry 600 ml high pressure reaction bottle containing a stir bar was charged with 375 ml of cyclohexane and 5.5 ml of DMBD. The vessel was capped with a crown cap and rubber gasket protected by a layer of Teflon tape or paper, using an ordinary bottle capper. The metal cap possessed two small holes where reactants could be added via syringe or cannula. The contents were stirred and warmed to 55° C. and then titrated with n-butyllithium to a dipyridyl end point. Polymerization was initiated by the addition of 0.450 ml of a 1.7M solution of t-butyllithium. The reaction was allowed to proceed for 15 hours after which time 47.7 ml of isoprene which had been freshly distilled from sodium metal was cannulaed into the reaction. Polymerization of the isoprene onto the DMBD block proceeded over a 7 hour period. Butadiene (7.3 ml) which had been passed through molecular sieves and alumina was pressured into the reaction vessel and allowed to polymerize for 8 hours. DMBD (5.5 ml) was then added to the triblock and the reaction was heated for an additional 13 hours. The living anion was quenched with 0.3 ml of degassed acetic acid and antioxidant Irganox 1087 was added to prevent crosslinking. A portion of the triblock polymer sample was dried in a vacuum oven for 12 hours. Gel permeation chromatography of the sample, using the DAWN laser light scattering dual detectors, determined the number average molecular weight (Mn) and the weight average molecular weight (Mw) of the polymer to be 171,800 and 208,500, respectively, for a dispersity index (Mw/Mn) of 1.21. The infrared spectrum possessed the characteristic peaks for the olefins of 1,4-butadiene (967 $cm^{-1}$), 1,4-isoprene (837 $cm^{-1}$), and 3,4-isoprene (889 $cm^{-1}$). The ratio of 3,4- to 1,2-polyisoprene was 93/7.

Example 10

This example shows the selective hydrogenation of the tetrablock copolymer of Example 9.

A Paar high pressure reactor was charged with 290 grams of cyclohexane containing 42 grams of the dissolved tetrablock polymer of Example 10 via vacuum suction through Teflon tubing. This amount of polymer represents 0.456 moles of isoprene unsaturation and 0.0795 moles of butadiene unsaturation in the polyisoprene and polybutadiene portion of the tetrablock. The reactor was evacuated and flushed several times with nitrogen. The reactor's contents were heated to 30° C. and 5.0 ml of a cobalt catalyst solution was added via syringe. The hydrogenation catalyst was prepared by adding 47.5 ml of a 1.7M solution of triethylaluminum in cyclohexane. The triethylaluminum was added slowly (over a 2 hours period) under a nitrogen atmosphere using an addition funnel. The final catalyst solution was 0.1M in cobalt and had an Al/Co ratio of 4:1. After the catalyst was added, the reactor was purged 4 times with hydrogen gas, pressured to 200 psi with hydrogen, and heated to 40° C. Another 4.0 ml of catalyst was added after 1 hour. Analysis of an aliquot of the reaction mixture after 2 hours using the FTIR showed complete disappearance of the peaks which correspond to the olefins 1,4-butadiene (967 $cm^{-1}$), 1,4-isoprene (837 $cm^{-1}$), and 3,4-isoprene (889 $cm^{-1}$). The reaction mixture was heated with 1 ml of hydrogen peroxide and 150 ml of a 10% citric acid solution to 65° C. for 1.5 hours. The aqueous layer was removed and the wash step was repeated. Gel permeation chromatography of the isolated hydrogenated polymer showed the polydispersity index had not been altered by the hydrogenation reaction.

The polymer was isolated in the usual manner and yielded a tough elastomeric product with greatly reduced cold flow, similar to the product described in Example 8.

The procedure of Examples 9 and 10 can be used to form tetrablock copolymer (e) having the structure D-I-S-D by substituting styrene for butadiene in the third polymerization step.

In addition to excellent resistance to cold flow, the selectively hydrogenated, unvulcanized polymers of Examples 3, 6, 8, and 10 as well as the other unvulcanized polymers of this invention have excellent oxidative, thermal and pyrolytic stability. After vulcanization, the polymers of the invention also have excellent elasticity at elevated temperatures and a high degree of resistance to solvents.

It will be apparent to those skilled in the art that the specific embodiments discussed above can be successfully repeated with ingredients equivalent to those generically or specifically set forth above and under variable process conditions.

From the foregoing specification, one skilled in the art can readily ascertain the essential features of this invention and without departing from the spirit and scope thereof can adapt it to various diverse applications.

We claim:

1. A solid elastomeric block copolymer wherein the terminal blocks are each a polymer of at least one conjugated diene D (D polymer), said diene D being a hydrocarbon containing a 1,3-conjugated diene structure wherein the 2 and 3 carbon atoms are each additionally bonded to a hydrocarbyl side group, with a preponderance of polymerized D units being 1,4-units; and at least one interior block is a hydrogenated polymer of at least one conjugated diene I (I polymer), said diene I being a hydrocarbon containing a 1,3-conjugated diene structure wherein one of the 2- and 3-carbon atoms is additionally bonded to a hydrocarbyl side group and the other is additionally bonded to a hydrogen atom, substantially all of the residual double bonds of said I polymer being hydrogenated and the number of unsaturated polymerized diene D units in said D polymer blocks being sufficient to vulcanize said block copolymer, said copolymer comprising about 1 to 50 wt. % of D polymer units and about 50 to 99 wt. % of I polymer units.

2. The block copolymer of claim 1 wherein said D diene is 2,3-dimethyl-1,3-butadiene (DMBD) and said I diene is isoprene.

3. The block copolymer of claim 1 which has been subjected to a vulcanization treatment.

4. The block copolymer of claim 1 comprising about 1 to 5 wt. % of D polymer units and about 95 to 99 wt. % of I polymer units.

5. The block copolymer of claim 1 which is a linear triblock copolymer having the structure D-I-D, wherein each "D" is a D polymer block and "I" is an I polymer block.

6. The block copolymer of claim 1 also containing polymerized units of an aryl-substituted olefin (S polymer units), such that said copolymer comprises about 1 to 49 wt. % of D polymer units, about 50 to 98 wt. % of I polymer units and about 1 to 30 wt. % of S polymer units.

7. The block copolymer of claim 6 wherein D is DMBD, I is isoprene, and S is styrene.

8. The block copolymer of claim 6 which has been subjected to a vulcanization treatment.

9. The block copolymer of claim 6 comprising about 1 to 25 wt. % of D polymer units, about 65 to 98 wt. % of I polymer units and about 1 to 10 wt. % of S polymer units.

10. The block copolymer of claim 6 which is a linear triblock copolymer having the structure DS-I-DS, wherein "DS" is a random or tapered copolymer block comprising D and S polymer units and "I" is an I polymer block.

11. The block copolymer of claim 6 which is a linear pentablock copolymer having the structure D-I-S-I-D wherein each "D" is a D polymer block, each "I" is an I polymer block and "S" is an S polymer block.

12. The block copolymer of claim 6 which is a linear pentablock copolymer having the structure D-S-I-S-D wherein each "D" is a D polymer block, each "S" is an S polymer block and "I" is an I polymer block.

13. The block copolymer of claim 6 which is a linear tetrablock copolymer having the structure D-I-S-D wherein each "D" is a D polymer block, "I" is an I polymer block and "S" is an S polymer block.

14. The block copolymer of claim 1 also containing at least one block of an essentially straight chain polyethylene (E polymer block).

15. The block copolymer of claim 14 wherein D is DMBD and I is isoprene.

16. The block copolymer of claim 14 which has been subjected to a vulcanization treatment.

17. The block copolymer of claim 14 comprising about 1 to 49 wt. % of D polymer units, about 50 to 98 wt. % of I polymer units, and about 1 to 30 wt. % of E polymer units.

18. The block copolymer of claim 17 comprising about 1 to 25 wt. % of D polymer units, about 65 to 98 wt. % of I polymer units and about 1 to 10 wt. % of E polymer units.

19. The block copolymer of claim 14 which is a linear pentablock copolymer having the structure D-I-E-I-D wherein each "D" is a D polymer block, each "I" is an I polymer block and "E" is an E polymer block.

20. The block copolymer of claim 14 which is a linear pentablock copolymer having the structure D-E-I-E-D wherein each "D" is a D polymer block, each "E" is an E polymer block and "I" is an I polymer block.

21. The block copolymer of claim 14 which is a tetrablock copolymer having the structure D-I-E-D wherein each "D" is a D polymer block, "I" is an I polymer block and "E" is an E polymer block.

22. The block copolymer of claims 1 in the form of a star-branched polymer wherein each branch contains said terminal D and interior I polymer blocks.

23. The star-branched block copolymer of claim 22 wherein each branch is a diblock polymer having the structure D-I- wherein "D" is a terminal or outermost D polymer block and "I" is an interior or innermost I polymer block.

24. The star-branched polymer of claim 22 wherein each branch also contains polymerized units of an aryl-substituted olefin (S units).

25. The star-branched block copolymer of claim 24 in which each branch is a diblock polymer having the structure DS-I- wherein each "DS" is a terminal or outermost block which is a random or tapered copolymer comprising polymerized D and S units and "I" is an interior and innermost I polymer block.

26. The star-branched block copolymer of claim 24 in which each branch is a triblock copolymer having the structure D-I-S- wherein "D" is a terminal or outermost D polymer block, "I" is an interior, central I polymer block and S is an interior innermost S polymer block.

27. The star-branched block copolymer of claim 24 in which each branch is a triblock copolymer having the structure D-S-I- wherein "D" is a terminal or outermost D polymer block, "S" is an interior, central S polymer block and I is an interior, innermost I polymer block.

28. The star-branched block copolymer of claim 22 wherein each branch also contains an essentially straight chain polyethylene block (E polymer block).

29. The star-branched block copolymer of claim 28 in which each branch is a triblock polymer having the structure D-I-E- wherein "D" is a terminal or outermost D polymer block, I is an interior, central I polymer block and E is an interior, innermost E polymer block.

30. The star-branched block copolymer claim 28 in which each branch is a triblock copolymer having the structure D-E-I- wherein "D" is a terminal or outermost D polymer block, E is an interior, central E polymer block and I is an interior, innermost I polymer block.

31. A precursor block copolymer wherein the terminal blocks are each a polymer of at least one conjugated diene D (D polymer), said diene D being a hydrocarbon containing a 1,3-conjugated diene structure wherein the 2 and 3 carbon atoms are each additionally bonded to a hydrocarbyl side group, with a preponderance of polymerized D units being 1,4-units; and at least one interior block is a polymer of at least one conjugated diene I (I polymer), said diene I being a hydrocarbon containing a 1,3-conjugated diene structure wherein one of the 2- and 3-carbon atoms is additionally bonded to a hydrocarbyl side group and the other is additionally bonded to a hydrogen atom, said copolymer comprising about 1 to 50 wt. % of D polymer units and about 50 to 99 wt. % of I polymer units, the amount of residual unsaturation in said D polymer blocks and I polymer blocks being such that on being subjected to selective hydrogenation, substantially all of the residual double bonds of said I polymer blocks are hydrogenated and sufficient unsaturation remains in said D polymer blocks to vulcanize said block copolymer.

32. The precursor block copolymer of claim 31 wherein said D diene is 2,3-dimethyl-1,3-butadiene (DMBD) and said I diene is isoprene.

33. The precursor block copolymer of claim 31 consisting of three linear blocks, the first and third blocks being said D polymer and the second block being said I polymer.

34. The precursor block copolymer of claim 31 also containing units of a polymerized aryl-substituted olefin (S units), such that said copolymer comprises about 1 to 49 wt. % of D polymer units, about 50 to 98 wt. % of I polymer units and about 1 to 30 wt. % of S polymer units.

35. The precursor block copolymer of claim 34 consisting of three linear blocks, the first and third blocks being a random or tapered copolymer comprising D and S polymer units and the second block being an I polymer.

36. The precursor block copolymer of claim 34 consisting of five linear blocks wherein the first and fifth blocks are said D polymer, the second and fourth blocks are said I polymer, and the third block is an S polymer.

37. The precursor block copolymer in claim 34 consisting of five linear blocks wherein the first and fifth blocks are said D polymer, the second and fourth blocks are said S polymer, and the third block is said I polymer.

38. The precursor block copolymer of claim 31 also containing at least one interior polybutadiene block composed of at least about 80% of 1,4-units.

39. The precursor block copolymer of claim 38 consisting of five linear blocks wherein the first and fifth block are said D polymer, the second and fourth blocks are said I polymer, and the third block is said polybutadiene.

40. The precursor block copolymer of claim 38 consisting of five linear blocks wherein the first and fifth blocks are said D polymer, the second and fourth blocks are said polybutadiene and the third block is said I polymer.

41. The precursor block copolymer of claim 31 in the form of a star-branched polymer wherein each branch comprises said terminal D and interior I polymer blocks.

42. The precursor star-branched block copolymer of claim 40 wherein each branch consists of two blocks, the terminal or outermost block being said D polymer and the interior or innermost block being said I polymer.

43. The precursor star-branched block copolymer of claim 41 wherein each branch also contains polymerized units of an aryl-substituted olefin (S polymer units).

44. The precursor star-branched block copolymer of claim 43 wherein S is styrene.

45. The precursor star-branched block copolymer of claim 43 wherein each branch consists of two blocks, the terminal or outermost block being a random or tapered copolymer comprising D and S polymer units and the interior or innermost block being said I polymer block.

46. The star-branched block copolymer of claim 43 wherein each branch consists of three blocks, the terminal or outermost block being said D polymer, the interior central block being said I polymer and the interior innermost blocks being an S polymer.

47. The precursor star-branched block copolymer of claim 43 wherein each branch consists of three blocks, the terminal or outermost block being said D polymer, the interior central block being an S polymer, and the interior innermost block being said I polymer.

48. The precursor star-branched block copolymer of claim 41 wherein each branch contains at least one interior polybutadiene block composed of at least about 80% of 1,4-units.

49. A precursor star-branched block copolymer of claim 48 wherein each branch consists of three blocks, the terminal or outermost block being said D polymer, the interior central block being said I polymer and the interior innermost block being said polybutadiene.

50. The precursor star-branched block copolymer of claim 48 wherein each branch consists of three blocks, the terminal or outermost block being said D polymer, the interior central block being said polybutadiene, and the interior innermost block being said I polymer.

* * * * *